July 17, 1934.  J. MUROS  1,967,061
CAMERA AND FILM SPOOL THEREFOR
Filed April 6, 1932   2 Sheets-Sheet 2
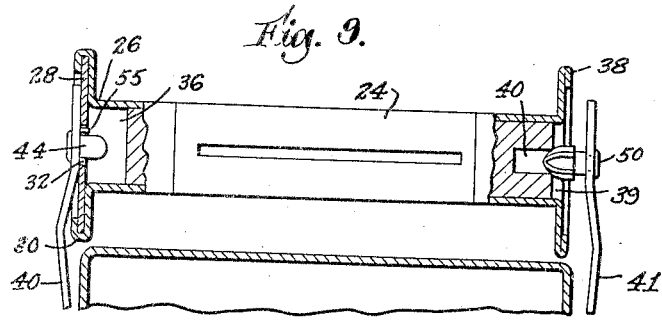
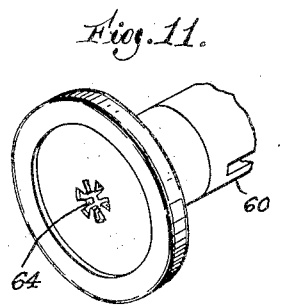
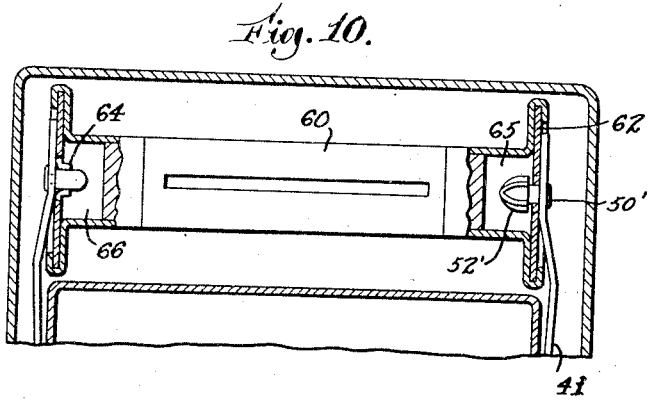
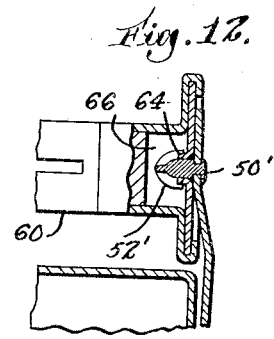
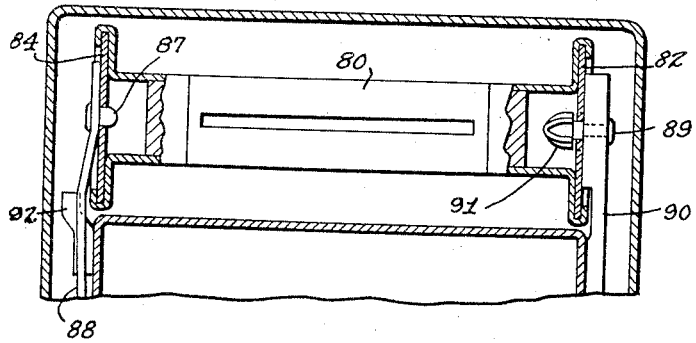
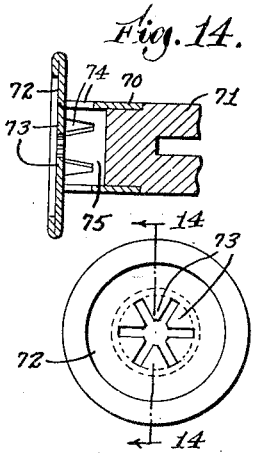
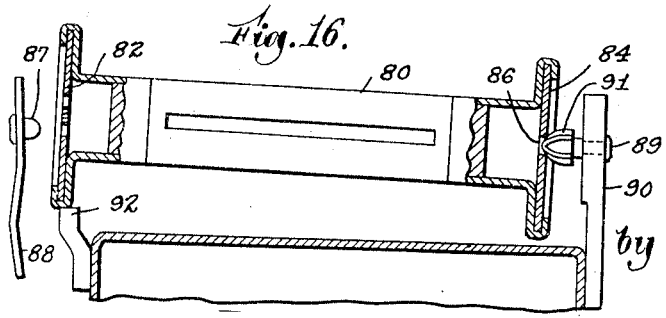
Inventor
Joseph Muros
by Henney & Witter
Attorneys Patented July 17, 1934

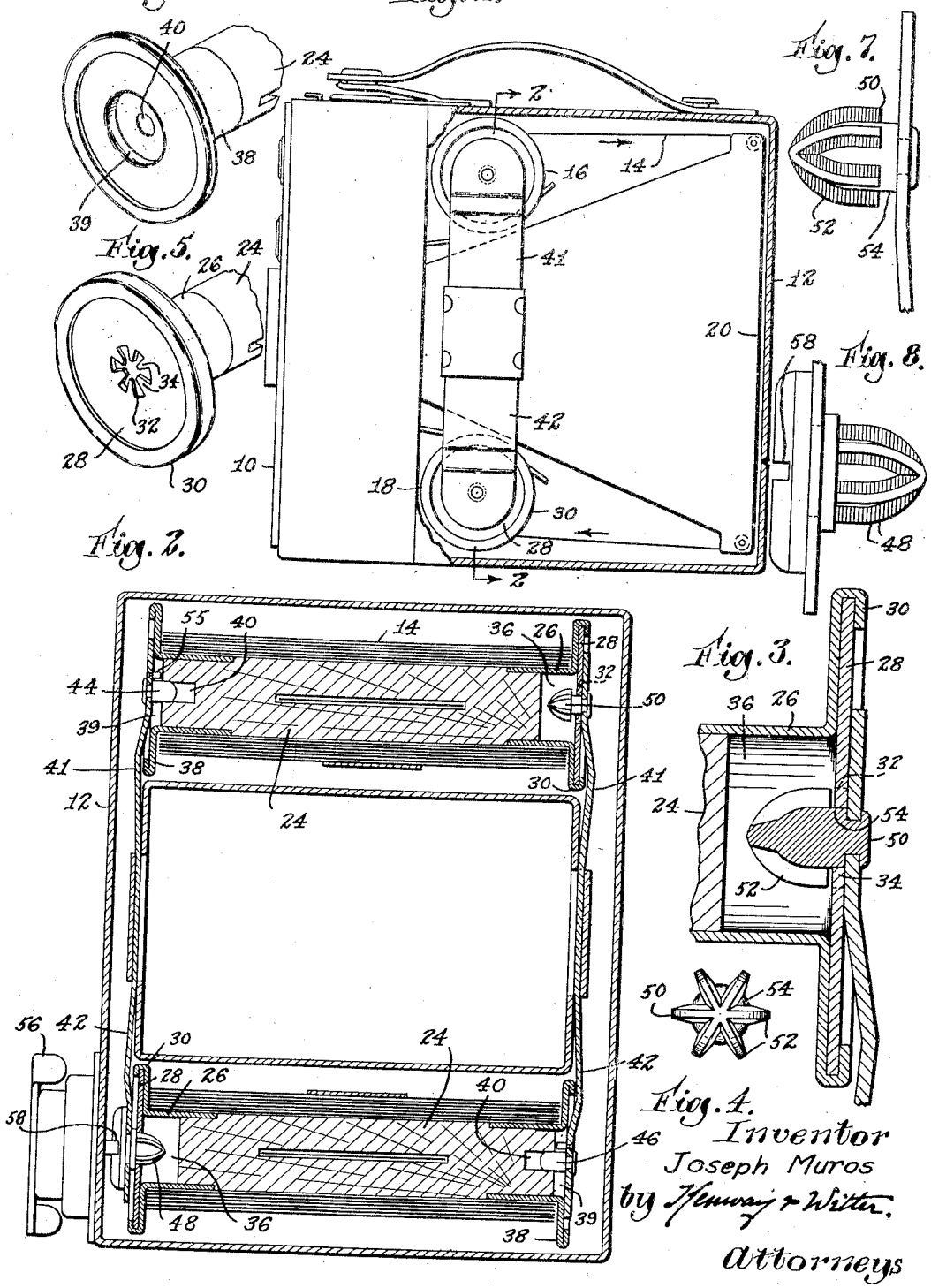

1,967,061

UNITED STATES PATENT OFFICE 1,967,061

CAMERA AND FILM SPOOL THEREFOR

Joseph Muros, Belmont, Mass.

Application April 6, 1932, Serial No. 603,484

16 Claims. (Cl. 242—71)

This invention relates to roll film cameras and to the film spools thereof. Such a camera has provision for supporting two spools, one carrying the non-exposed film and being free to unwind and the other being adapted to receive and rewind the film therefrom after it is exposed. When reloading a camera, the new roll is located in place and then threaded onto the rewinding spool, care being used so to locate the new roll that the emulsion side, and not the protective paper side, of the film faces the lens. An experienced operator ordinarily has no difficulty in loading the present known cameras except as he may thoughtlessly place the new spool in a position wherein the paper side of the film faces the lens, and in that case the sensitive emulsion is not exposed through the lens and no pictures obtained. It may very frequently happen, however, that an inexperienced operator will place the new spool in the wrong position, which position is merely an end to end reversal of the spool, the present known cameras supporting the spool by a pair of like studs which equally permit of either position. A burden is thus placed upon the operator, with the result that irreplaceable pictures are frequently lost, films destroyed, and prospective camera and film customers discouraged and lost. One of the objects of my invention is the provision of a camera and film spool so constructed that in reloading the camera the new spool can be operatively inserted only in the proper position, thus entirely eliminating the above objections and making improper reloading of the camera impossible.

The object of my invention may be accomplished in various ways, as by the provision of means preventing improper insertion of the new spool into the camera, or by the provision of means preventing unwinding of the spool if improperly inserted. The spool is also preferably so constructed that it will fit present known cameras as well as the camera disclosed herein, which camera is also so constructed that it will not receive film spools heretofore on the market. Thus, while the improved spool of my invention may be freely purchased and used in the old style cameras, the old style spools cannot be used in the improved camera of my invention. The provision of such an improved combination comprises a further object of the invention.

A camera film spool is ordinarily perforated at both ends whereby to receive studs supporting the spool for free rotation when the spool is carrying the unexposed film. One or more shoulders are also provided at one end of the spool adjacent to the perforation for engagement by a spool rotating key in the camera when the spool is located in the film rewinding position. One aspect of my invention as herein described comprises key-engaging means on the spool, including shoulders, and cooperating means on the camera, or on one of its said studs, for interfering with the shoulders and preventing rotation of the unexposed film spool when in improper position in the camera, the said means and shoulders presenting no interference to free rotation of the spool in its proper position. The provision of an improved spool of this nature comprises a further object of the invention.

These and other features of the invention will be best understood and appreciated from the following description of a preferred embodiment thereof, selected for purposes of illustration and shown in the accompanying drawings, in which Fig. 1 is a side elevation of a camera, partially broken away to expose the film spools therein;

Fig. 2 is a sectional view taken on line 2—2 of Fig. 1;

Fig. 3 is an enlarged fragmentary sectional view showing the supporting of one end of the film spool for free rotation on a novel supporting stud;

Fig. 4 is an end elevation of the stud;

Fig. 5 is a perspective view of the driving end of the spool;

Fig. 6 is a like view of the other end of the spool;

Fig. 7 is a side elevation of the spool supporting stud shown in Figs. 3 and 4;

Fig. 8 is a side elevation of the stud for rotating the spool when rewinding the film;

Fig. 9 is a fragmentary view of the top portion of Fig. 2 but showing the spool reversed end to end;

Fig. 10 illustrates a modified form of spool in proper position as the idler spool in the camera;

Fig. 11 is a perspective view of one end of this spool;

Fig. 12 is a fragmentary view of Fig. 10 but showing the spool in reversed end-to-end relation;

Fig. 13 is an end view of a further modified form of spool;

Fig. 14 is a sectional view taken on line 14—14 of Fig. 13;

Fig. 15 is a view similar to Fig. 10 but showing a modified form of the invention; and Fig. 16 is a like view but showing the spool in reversed end-to-end relation.

In Figs. 1 and 2 of the drawings, I have illustrated a standard roll film camera comprising a box 10 having a portion 12 removable for reloading the camera. The unexposed portion of the film 14 is carried by a spool 16 and is rewound onto a spool 18 after being exposed at 20. The spools are perforated at their ends whereby to receive studs on which the spools can rotate. These studs and the spools have heretofore been such as to permit insertion of a spool 16 in the position illustrated in Fig. 2, or in reversed end-to-end position. In the latter position, the protective paper side of the film faces the lens at 20, with the result that no exposure of the sensitized film takes place. In accordance with one form of my invention which I will now describe, I so construct these parts that the spool at 16 may rotate and permit unwinding of the film therefrom only when in the proper position illustrated in Figs. 1, 2 and 3.

The spools 16 and 18, as illustrated, each comprises a body portion 24, which may be of wood, supported by the metallic end members shown in Figs. 5 and 6. The driving end of the spool is shown in Fig. 5 and comprises a metallic sleeve 26 mounted on the body of the spool and crimped over a disk 28 at 30. The disk is centrally perforated at 32 in a manner providing a plurality of radially disposed fingers 34 in the plane of the disk and projecting into the perforation, the spaces between the fingers providing diametrically extending slits for receiving the rotary key of standard cameras or the novel rotating key of the camera herein described. It will also be noted, from Fig. 9, that the end of the wooden body of the spool terminates considerably short of the disk 28, thus providing a chamber 36, for a purpose hereinafter described. The metallic member 38 on the opposite end of the spool is substantially the same as is now provided on the idler end of standard camera spools, the end of the body portion 24, however, being somewhat short of the spool end, whereby to provide a countersink 39 in the spool end, which end is also perforated at 40.

The studs for supporting the spools 16 and 18 are carried on spring arms 41 and 42 respectively. Plane cylindrical studs 44 and 46 are provided for engaging the perforations 40 in the idle end of the spool. The end 30 of the spool may be termed the driving end, since when positioned at 18 the spool is rotated by the engagement of a rotary stud 48 fitting within the perforation 32, the shape of the stud conforming to the shape of the perforation. A similar, but non-rotary, stud 50 is provided for the idler or supply spool at 16, this stud having a toothed portion 52 corresponding in cross sections to the perforation 32 and an adjacent cylindrical or non-toothed shank or stem 54. When the spool is properly positioned at 16 (Fig. 2), the fingers or teeth 34 are located over the smooth shank 54 of the stud and the spool is free to rotate. However, should the operator place the spool in the wrong position (Fig. 9), i. e., reversed end to end, a small lug 55 on the arm 41 adjacent to the stud 44 will engage in the perforation 32 between its fingers 34 and prevent unwinding rotation of the spool, thereby informing the operator of the error and requiring correction before proceeding further with the threading up of the film. It will be noted that this lug 55 provides a positive non-releasable means which will at all times serve to prevent rotation of the spool while it is reversed from its correct position. When the film is properly loaded (Fig. 2), the countersink 39 accommodates the lug 55 in a manner not interfering with free unwinding rotation of the spool. When the spool 16 is thus positioned and the film threaded up to the spool 18, the cover 12 may be replaced and the film may be operated by a key 56 having a portion engaging in a slot 58 of the stud 48.

The novel spool above described is so constructed that it will fit in a camera adapted to receive standard film spools, but the use of my camera herein described is limited to the novel spools herein disclosed. It is well known that the proper and efficient functioning of cameras depends to a very large extent upon the quality of films used, but when the results obtained are unsatisfactory the camera is more often blamed than are the films. My invention makes is possible for a manufacturer of cameras and films to eliminate the use of old or inferior films in his camera product and at the same time permit the public to purchase his improved film product and use the same in standard cameras as freely as in cameras of his own manufacture. It should be especially noted that I am enabled to carry out this feature of the invention by providing the spool with a chamber 36 in its driving end for receiving the headed portion 52 of the idler stud 50, this end of the spool being supported for free rotation on the non-toothed portion 54 of the stud when the headed portion is within the chamber.

It is appreciated that the object of my invention may be secured by constructions other than that above specifically described, and in Figs. 10–12 I have illustrated such a modified form of spool. This spool 60 has a driving end 62 identical with the spool end shown in Fig. 5. The opposite end thereof (Figs. 11 and 12) is perforated in like manner but the fingers 64 are somewhat longer and are bent inwardly toward the longitudinal center of the spool, both ends of the spool being substantially alike except for the arrangement and length of these fingers. The fingers at the spool end 62 are in the plane of the disk forming the end of the spool, and the holes between the ends of the fingers at both ends of the spool are of a size to fit the studs of standard cameras. When the spool is properly positioned, as the idler spool in the camera (Fig. 10), it is free to rotate. However, when the spool is reversed end to end, the inwardly extending fingers 64 engage the toothed head 52′ of the stud 50′ and prevent rotation of the spool. It will be noted that this spool is provided with chambers 65 and 66 at its ends for receiving the stud head 52′. It should furthermore be noted that, in addition to serving the safety feature of preventing improper reloading of the camera, this form of my improved spool is also of greater convenience when used at 18 in rewinding the film, since when thus used it may be in either of its two endwise positions. Spools heretofore used have had a keyway at one end only and have, therefore, required that the film be started thereon in a direction locating that keyway adjacent to the winding key of the camera. Either end of this spool is adapted to cooperate with the rotary stud 48.

The driving end of my novel spool, as illustrated in Fig. 5 and above described, may be constructed in various forms. In Figs. 13 and 14, I have illustrated a novel and inexpensive construction thereof and a construction which requires only a slight modification of the present known and standard camera spool. The metallic end member of this spool comprises a hub portion 70 fitting over the body portion 71 of the spool and an integral disk portion 72. A plurality of teeth or fingers 73 are cut out of the hub portion at 74 and bent to the radial position illustrated. These fingers serve the same function as do the fingers 34 of Fig. 5. A chamber 75 is also provided in the spool end for accommodating the stud end 52.

While I have above described means for preventing rotation of the spool when improperly inserted at 16, it is possible to serve the purpose of the invention by preventing positively the insertion of the spool into its improper position. In Figs. 15 and 16 of the drawings, I have illustrated a novel construction for performing this function. This spool 80 has one end 82 of substantially the same construction as that illustrated in Fig. 5. The opposite end includes a plane disk 84 centrally perforated at 86 to receive a stud 87 mounted on a spring arm 88. The stud 89 is the same as stud 50 and is mounted on a rigid arm 90. The spool is shown inserted in its proper position in Fig. 15, the perforations in the end 82 receiving the stud head 91 therethrough. When attempt is made to insert the spool in its reversed end-to-end position (Fig. 16), the perforation 86 will not receive the head 91 and insertion of the opposite end of the spool is obstructed by an abutment 92 on the camera. The spool and camera as thus constructed, therefore, positively prevent insertion of the spool in the improper position at 16.

Having thus described my invention, what I claim as new and desire to secure by Letters Patent is:

1. In a roll film camera and the idler spool therein, means for supporting the spool rotatably when properly positioned in the camera, and means non-releasable from the exterior of the camera and including abutting shoulders on one end of the spool and on the camera preventing such rotation when the position of the spool is reversed end to end.

2. In a roll film camera and the idler spool therein, means including a stud for supporting the spool rotatably when properly positioned in the camera, and means non-releasable from the exterior of the camera and including abutting shoulders on one end of the spool and on the stud preventing such rotation when the position of the spool is reversed end to end.

3. In a roll film camera and the idler spool therein and having a key-engaging and rotating shoulder on one end thereof, means for supporting the spool rotatably at all times when properly positioned in the camera, and means non-releasable from the exterior of the camera and engaging said shoulder and preventing such rotation when the position of the spool is reversed end to end.

4. In a roll film camera and the idler spool therein, key-engaging and rotating shoulders on one end of the spool and like shoulders on the other end thereof but located nearer the longitudinal center of the spool, and means including a non-rotatable stud having a toothed end portion and an adjacent non-toothed portion for supporting the spool rotatably when properly positioned in the camera, the first-named shoulders being positioned over the non-toothed portion of the stud and permitting free rotation of the spool when properly positioned in the camera and the second-named shoulders being positioned over the toothed portion of the stud and preventing rotation of the spool when reversed end to end.

5. In a roll film camera and a film spool therefor, a plurality of teeth integral with one end of the spool and extending into a centrally-disposed stud-receiving opening therein, the spool having a chamber therein longitudinally inward of said teeth, a rotary stud at one side of the camera for extending into said opening and engaging the teeth to rotate the spool, and a second and non-rotatable stud at the opposite side of the camera having a toothed end portion of a shape and size congruous with said spool opening and having an adjacent smaller portion, the toothed end portion being adapted to project through said opening and into the chamber to a point beyond the spool teeth in a manner permitting the spool to rotate with its teeth in contact with said smaller portion.

6. A film spool for cameras having the ends centrally perforated to receive supporting studs, inwardly projecting teeth about one end perforation adapted to be engaged by a rotary key in a camera, and inwardly projecting teeth about the other end perforation located nearer the longitudinal center of the spool than the first-named teeth.

7. A film spool for cameras having metallic disk-like ends centrally perforated to receive supporting studs, teeth integral with one of said ends and projecting into its perforation and adapted to be engaged by a key in a camera, and inwardly projecting teeth integral with the other end and located nearer the longitudinal center of the spool than the first-named teeth.

8. The film spool defined in claim 6, in which the arrangement and shape of the teeth at one end are substantially congruent with that of the teeth at the other end.

9. The film spool defined in claim 7, in which the first-named teeth are substantially in the plane of their supporting disk and the second-named teeth are bent inwardly from their supporting disk toward the longitudinal center of the spool.

10. A film spool for cameras having metallic disk-like ends centrally perforated to receive studs, teeth integral with one of said ends and projecting inwardly of its perforation in the plane of the disk, said teeth being adapted to be engaged by a rotating key in a camera when the spool is in one position therein and being adapted to be engaged by a lug in the camera to prevent rotation of the spool when in another and improper position, the other disk having a countersink about its perforation, which countersink is adapted to receive said lug and permit free rotation of the spool.

11. A film spool for cameras, comprising a core and metallic end members thereon, teeth integral with one of said members and projecting inwardly of a central opening therein, said teeth being adapted to be engaged by a rotating key in a camera when the spool is in one position therein and being adapted to be engaged by a lug in the camera to prevent rotation of the spool when in another and improper position therein, the other end member being bent inwardly to provide a hub fitting over one end of the core, said end of the core being short of the end of the spool in a manner providing a countersink in the spool end, which countersink is adapted to receive said lug and permit rotation of the spool.

12. In a camera and an idler film spool therefor, a plurality of teeth integral with one end of the spool and extending into a centrally-disposed stud-receiving opening therein, the spool having a chamber therein located longitudinally inward of said teeth, a stud carried by the camera and having a toothed head of a shape and size congruous with said spool opening and having an adjacent and smaller shank portion supporting the head, the toothed head being adapted to project through said opening and into the chamber to a point beyond the spool teeth in a manner permitting the spool to rotate with its teeth in contact with said smaller portion when the spool is in proper endwise position in the camera.

13. In combination, a camera, an idler spool therefor having two dissimilar and centrally-disposed openings in its opposite ends respectively and a chamber within the spool inwardly of one of such openings, and a stud carried by the camera and having a toothed head of a shape and size to pass through said one opening and into the chamber but not through the other opening and having an adjacent and smaller shank portion supporting the head, said chamber being of a size and shape permitting free rotation of the toothed head therein.

14. In combination, a camera, an idler spool therefor having disk-like ends, said ends having two dissimilar and centrally-disposed openings respectively and the spool having a chamber therein inwardly of one of such openings, and a non-rotatable stud rigidly carried by the camera and having a toothed head of a shape and size to pass through said one opening and into the chamber but not through the other opening and having an adjacent and smaller shank portion supporting the head, the relative shapes and sizes of the chamber, head and shank being such as to permit rotation of the spool on the shank when the head is extended into the chamber through the said one opening.

15. A film spool for cameras, having an elongated film receiving core of wood or the like with sheet metal caps independently mounted on both ends thereof, one cap having a central perforation with inwardly extending radially disposed projections about its periphery and an internal chamber beneath said perforation and between the cap and the adjacent end of the core.

16. A camera having a stud with an enlarged toothed head and a smooth head supporting shank of reduced diameter, in combination with a film spool having in one end a perforation with its edge slotted to slide over the toothed head of the stud and freely turn on the shank thereof, and a chamber formed in the end of the spool beneath said perforation and of sufficient size freely to receive the head of the stud.

JOSEPH MUROS.